Sept. 18, 1923.

G. W. LIBBY

ANGLE MEASURING DEVICE

Filed Oct. 19, 1922

1,468,598

Inventor.
George W. Libby

Patented Sept. 18, 1923.

1,468,598

UNITED STATES PATENT OFFICE.

GEORGE W. LIBBY, OF PORTLAND, MAINE.

ANGLE-MEASURING DEVICE.

Application filed October 19, 1922. Serial No. 595,600.

*To all whom it may concern:*

Be it known that I, GEORGE W. LIBBY, a citizen of the United States, residing at Portland, in the county of Cumberland and State of Maine, have invented new and useful Improvements in Angle-Measuring Devices, of which the following is a specification.

My invention relates to a device which is designed to provide a simple, compact and portable apparatus for "laying-out" or determining angles in carpentry and engineering work.

Attached to the ordinary two-foot rule it offers a very convenient substitute for an expensive protractor, and withal will be found sufficiently accurate for all ordinary lay-outs or calculations in angles.

It has neither screws, nuts or other complicated mechanism to get out of order and will measure angles of from 5 to 90, and more, degrees of the circle. When folded it occupies practically no more space than a bare rule, and the combination is therefore a very desirable acquisition for a mechanic who does not care to encumber his person with heavy and bulky tools.

While primarily designed to be attached to the rule and assembled at the factory where the latter is manufactured, this angle measurer may be mounted on any rule or on two hinged pieces by any mechanic having access to a protractor with which to accurately mark the graduations.

I am aware that there are angle measuring devices now on the market, but I believe, in my present invention, I have made some advance in this line, particularly in the method of attaching and detaching the indicator clip from one leg of the rule to the other for the purpose of folding the rule compactly.

Figure 1:
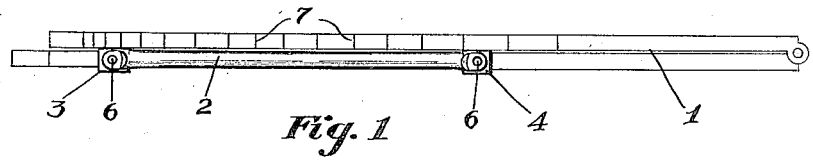
Figure 7:
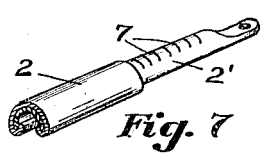
Figure 2:
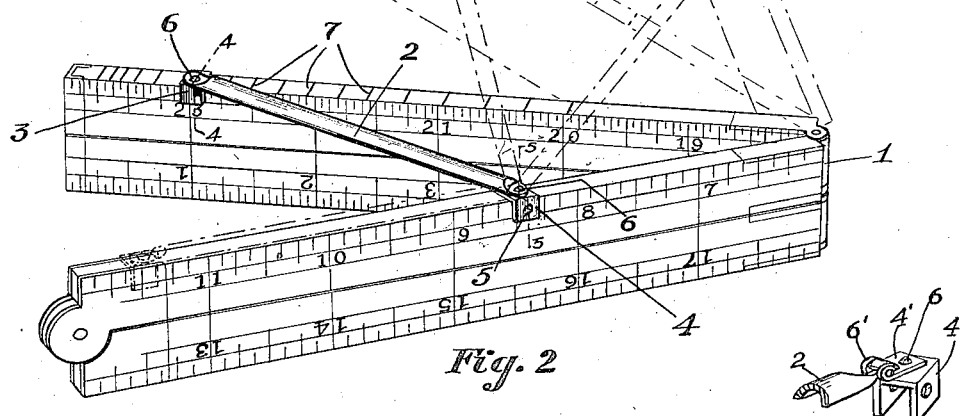
Figure 8:
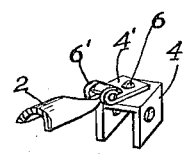
Figure 3:
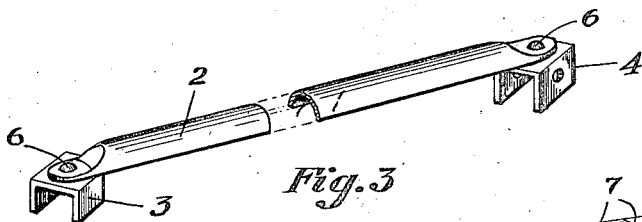
Figure 6:
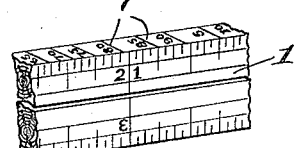
Figure 4:
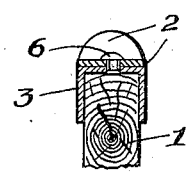
Figure 5:
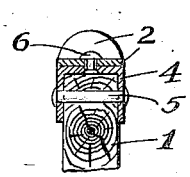

Accompanying this specification is a drawing in which Fig. 1 is a plan view of my angle measuring device, shown mounted on a two-foot rule, and with the rule folded; Fig. 2 is a view in perspective of the device mounted on the rule, and with the latter opened; this view also shows, in dot-and-dash lines, the different positions assumed by the legs of the rule while laying-off different angles; Fig. 3 is a view, in perspective, of the apparatus detached from the rule; Fig. 4 is a section at the indicator clip joint taken on line 4—4, Fig. 2; Fig. 5 is a section through the fixed clip joint taken on line 5—5, Fig. 2; Fig. 6 is a view, in perspective, showing the graduations on the rule, with the degrees indicated by figures; Fig. 7 is an alternate design in which I use a telescoping connecting bar and mark the graduations on the inner member, discarding the graduations on the rule itself, and Fig. 8 shows a modification of the connection between connecting bar and fixed clip.

Similar numerals refer to similar parts throughout all the different views of the drawing.

1 is an ordinary two-foot rule, with linear graduations as usually made on the faces, 2 is the connecting bar, 3 is the indicator clip and 4 the fixed clip. Both of these clips are made inverted U shape and bear on the faces of the rule. I attach the device to the rule with a rivet 5 which extends through both sides of the fixed clip and through the rule. The connecting bar is loosely riveted to the tops of both clips, as at 6, 6, allowing freedom of play but with no slack. I may, however, elect to use the alternate design shown in Fig. 8, where a hinge is provided for the connecting bar by inserting hinge member 4' between the connecting bar and clip. The bar will then swing upward over pin 6' when indicator clip is released from rule. This will tend to prevent breakage of connecting bar at the rivet 6 which might occur if made as seen in Fig. 3. By observing the broken out portion of the connecting bar, shown in Fig. 3, it will be seen that the shape, in cross section, is preferably made in a half-tube form, to increase its strength and stiffness. The indicator clip is made of a strong, springy material and the sides extend down over and bind the rule in a strong, frictional grip.

The marks or graduations 7, on the top edge of the upper leg of the rule (see Fig. 2) indicate the angle between the two legs of the rule when the "reading" is taken adjacent the outer edge of the indicator clip. These graduations may be cut or marked to suit the individual requirements of the user of the rule and they may be numbered (see Fig. 6) if desirable to do so.

In Fig. 7 I show a design of a connecting bar telescoping in its action, with the graduations 7 marked on the inner member.

The two tubular members composing the bar are held together by a tight frictional fit and the removable clip, in this case, is not adapted to slide along the rule, but is held to one location on the latter until such time as it is desired to fold it (see Fig. 1).

Fig. 2 shows the combination as it appears when in actual use. When not in use the indicator clip is detached from the angle-graduated leg of the rule and transferred to the opposite leg, to allow of the rule being folded.

It will be understood that I do not restrict myself to the use of a two-foot rule as the means whereby I may give application to my device, as any hinged rule, or any two hinged members with straight sides may serve the purpose as well.

Having thus described my invention I claim:

In an angle measuring device, the combination, with two flat sided members pivoted together at one end, of a U-shaped clip, the sides of which straddle the sides of one of the said members and fixedly attached thereto a spaced distance from said pivot, a U-shaped clip slidably mounted on the other of the said members and embracing it with a strong frictional grip, a bar pivotally connecting the clips, there being graduations on the member carrying the slidable U-shaped clip adapted to cooperate with said clip to indicate the angle between the pivoted members.

GEORGE W. LIBBY.